United States Patent [19]
Brown et al.

[11] 4,258,362
[45] Mar. 24, 1981

[54] PHASE COHERENT TRACKER OF AN ARBITRARY NUMBER OF SIGNALS

[75] Inventors: Joel E. Brown, Baltimore; Kelly C. Overman, Pikesville, both of Md.

[73] Assignee: Westinghouse Electric Corp., Pittsburgh, Pa.

[21] Appl. No.: 78,879

[22] Filed: Sep. 26, 1979

Related U.S. Application Data

[63] Continuation of Ser. No. 649,299, Jan. 15, 1976, abandoned.

[51] Int. Cl.³ .............................................. G01S 13/70
[52] U.S. Cl. ....................................................... 343/7.3
[58] Field of Search ........................... 343/7.3, 17.1 PF

[56] References Cited
U.S. PATENT DOCUMENTS

| 3,354,455 | 11/1967 | Briggs et al. | 343/7.3 |
|---|---|---|---|
| 3,881,101 | 4/1975 | Pederson et al. | 343/17.1 PF X |
| 3,900,850 | 8/1975 | Ulman et al. | 343/7.3 |
| 3,936,823 | 2/1976 | Weber | 343/7.3 |
| 4,040,054 | 8/1977 | Overman | 343/7.3 X |

*Primary Examiner*—Malcolm F. Hubler
*Attorney, Agent, or Firm*—W. E. Zitelli

[57] ABSTRACT

A tracker for predicting the occurrence of an arbitrary number of phase coherent signals comprising a signal train, which predicts the phase and pulse repetition intervals for each individual signal and which maintains phase coherence of all signals provided at least one signal is present. A multiplexing system permits tracking of a multiple of phase coherent signal trains by successively connecting a series of tracker channel memories with the phase and pulse repetition interval error correction circuitry required for a single tracker. Each channel maintains phase coherency for all signals of its associated signal train while at least one signal of the train is present.

14 Claims, 9 Drawing Figures

INITIAL VALUES

| PRI POINTER | |
|---|---|
| ADDRESS | INFORMATION WORD |
| 0 0 0 0 | 0 0 0 1 |
| 0 0 0 1 | 0 0 1 0 |
| 0 0 1 0 | 0 0 1 1 |
| 0 0 1 1 | 0 0 0 0 |

| PRI MONITOR | |
|---|---|
| ADDRESS | INFORMATION WORD |
| 0 0 0 0 | 0 0 0 1 |
|  |  |
|  |  |
|  |  |

SEQUENCE OF VALUES IN PRI MONITOR

| ACCESS TO PRI MONITOR ADDRESS | PRI MONITOR INFORMATION WORD |
|---|---|
| FIRST THERE | 0 0 1 0 |
| SECOND THERE | 0 0 1 1 |
| THIRD THERE | 0 0 0 0 |
| FOURTH THERE | 0 0 0 1 |

PHASE COHERENT TRACKER OF AN ARBITRARY NUMBER OF SIGNALS

CROSS-REFERENCES TO RELATED APPLICATIONS

This is a continuation of application Ser. No. 649,299, filed Jan. 15, 1976, now abandoned.

The invention herein disclosed is related to the U.S. patent application entitled "Tracking of Radar Signals", Ser. No. 608,305, which was filed Aug. 27, 1975 by Kelly C. Overman and is assigned to Westinghouse Electric Corporation, now U.S. Pat. No. 7,040,054 issued Aug. 2, 1977.

BACKGROUND OF THE INVENTION

1. Field of the Invention

The invention relates to signal trackers which predict the occurrence of a detected signal and, specifically, to digital signal trackers which predict the phase and pulse repetition intervals of a train of phase coherent signals while maintaining phase coherency with all signals provided at least one signal is present.

2. Description of the Prior Art

Formerly, signal trackers were analog devices which, while adequate for some purposes, were subject to noise interference and accuracy limitations so that they were not useful for applications requiring a certain high degree of precision. Moreover, these devices were comprised of a large number of components and therefore required a considerable amount of physical space as well as demanding a high power supply.

More recently, as described in the copending application of Kelly C. Overman, Ser. No. 608,305, now U.S. Pat. No. 4,040,054, signal trackers have been of the digital variety in which multiplexing techniques were utilized to reduce the physical space and operating power requirements of signal trackers. These digital trackers avoided the inaccuracy and environmental susceptibility of analog devices, thereby affording a new level of accuracy and dependability in tracking devices. However, each tracker in this multiplex group of prior art trackers could predict the phase and pulse repetition interval of each signal in the train being tracked only if at least half those signals were present. Specifically, memories within the tracker in which the pulse repetition intervals of the incoming signals were stored could accommodate the pulse repetition interval of only two signals. If the incoming signal were comprised of more than two signals, multiple pulse repetition interval memories were dedicated to each individual tracker. If, as in practice is often the case, both signals of a pulse repetition interval memory were lost for any extended period, the phase drift between the detected signals and the tracker's internal clock, coupled with errors in the pulse repetition interval prediction, would cause both signals to be lost and they would not be re-acquired until initial signal acquisition techniques were again instituted.

There was, therefore, a need for a digital signal tracker which would maintain phase coherency with a signal train comprised of a number of phase coherent signals having individual pulse repetition intervals without loss of signals which would go undetected for some considerable length of time and then reappear later in the signal train. Additionally, it was seen that it would be advantageous to have a signal tracker capable of tracking a signal train comprised of a high number of signals, but which would also conserve pulse repetition interval memory hardware.

SUMMARY OF THE INVENTION

The disclosed invention is an improvement upon a signal tracker including apparatus which is operative to predict the time of arrival of pulses in a pulse signal train comprised of phase coherent pulse signals which are separated in time by a multiple level of staggered pulse repetition intervals. Predetermined values representative of the pulse repetition intervals of the multiple stagger level pulse train are stored in a PRI memory. A value corresponding to one signal pulse of said pulse train is selected from the PRI memory and stored in a time of arrival (TOA) memory wherein it is counted toward the predicted time of arrival of the one pulse signal corresponding thereto by discrete values of time. An error between the predicted time of arrival and the actual time of arrival of the one pulse signal is fed into an error correction loop which adjust the phase of the pulse train and the pulse repetition interval corresponding to the one pulse signal. The improvement is directed to a means for establishing the phase coherent order in which the values stored in the PRI memory are selected for storage and counting in the TOA memory to predict the arrival times of the pulse signals respectively corresponding thereto, the order establishing means comprising a PRI pointer memory which has a memory address corresponding to each address in the PRI memory The PRI pointer memory contains the information for establishing the phase coherent order in which the PRI memory addresses are to be accessed and, therefore, determines which PRI memory address will be dedicated to a particular pulse signal of the pulse signal train. The address information of the PRI pointer memory is provided to the PRI memory to select a PRI value stored therein and is also provided to a register of a PRI monitor which is operative to access in a timely fashion a register in the TOA memory for storage and counting of the PRI value selected from the PRI memory. The improvement also includes a pointer hold register which cooperates with the PRI pointer through a pointer multiplexer to enable the error correction loop to correct the PRI memory value at the proper address when an error between the predicted time of arrival and the actual time of arrival of a signal is detected.

For a signal tracker which is multiplexed to track a plurality of pulse trains of multiple level staggered pulse repetition intervals, the number of addressed registers in the PRI monitor, the pointer hold memory and corresponding TOA memory is expanded commensurately with the number of pulse trains which are tracked. Accordingly, the PRI memory and PRI pointer memory are similarly expanded to accommodate the increased amount of PRI information for predicting the time of arrival of the pulse signals of the pulse trains under track. In addition, a tracker counter is included to provide a tracker address for each pulse train under track to dedicate corresponding registers in the PRI monitor, the pointer hold memory and TOA memory for the multiplexed operations performed thereby. More specifically, the registers of the TOA memory, the PRI monitor and the pointer hold memory are accessed in a multiplexed fashion based on the tracker address rendered by the tracker counter to store and count the selected PRI value, to determine the address of the next PRI value in the PRI memory and to determine the address of the PRI value in the PRI memory for correction respectively, for each pulse train being tracked.

DESCRIPTION OF THE PREFERRED EMBODIMENT

As explained previously, digital trackers of the prior art afforded distinct advantages over analog trackers but were prone to lose track of signals which did not occur for some length of time and then again reappeared. This was because each pulse repetition interval memory could accommodate only two periodic signals of the pulse train and when neither of these signals was present, no correction was made for the drift between the transmission frequency and the frequency of the tracker's internal clock even though a phase shift correction was made for other PRI memories for which a signal was being detected. The preferred embodiment of the present invention maintains phase coherency for all periodic signals as long as at least one signal is present by maintaining all PRI values in a single memory whose order of access is determined by a PRI pointer and whose time of access is determined by an address in a PRI monitor which is operative with a tracker address in the TOA memory corresponding to the specified PRI memory.

Figure 1:
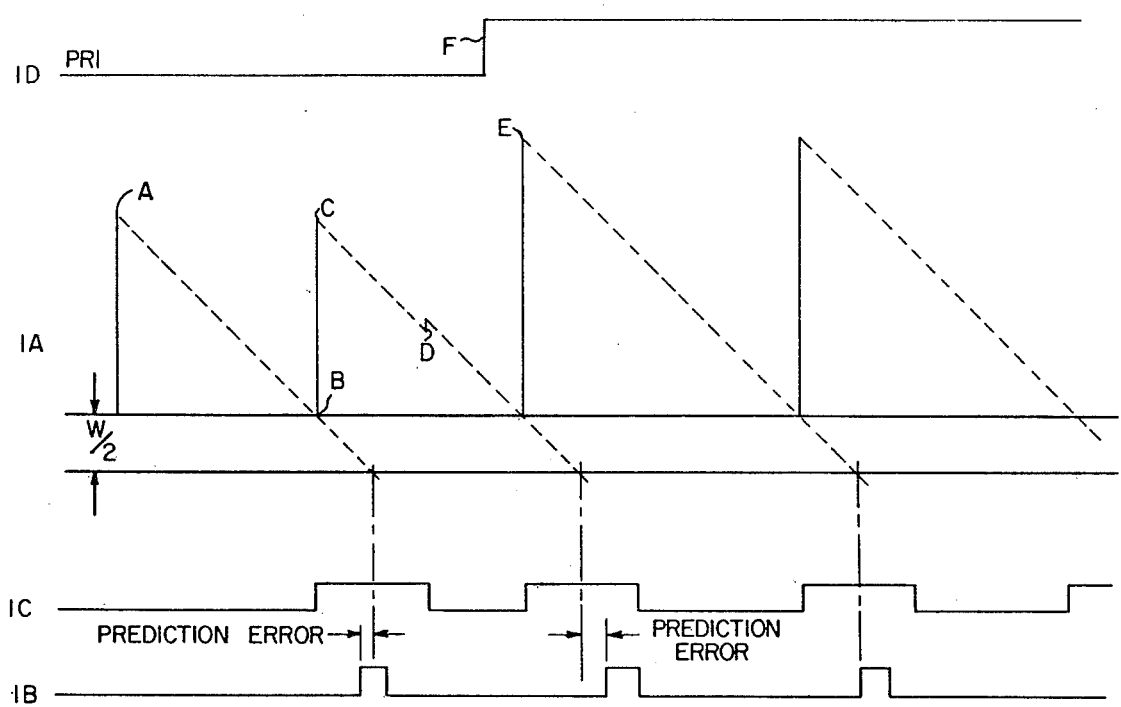
FIG. 1 illustrates the operation of the signal tracker of the preferred embodiment while tracking a signal pulse train having a single stagger level.

The operation of the disclosed multiplexed, phase coherent signal tracker of the preferred embodiment which is shown in FIGS. 3, 4, 5, 6 and 7 is illustrated generally in FIG. 1 for a single tracker tracking a pulse train of a single pulse repetition interval, hereafter referred to as PRI. Although the preferred embodiment is capable of tracking an arbitrary number of pulse trains, each of which may have an arbitrary number of phase coherent signals, each having distinct PRI values, the operation of the device will be easier to comprehend by first using the example of a single pulse train having a single PRI level. The present invention is an improvement upon the device described in copending U.S. patent application "Tracking of Radar Signals", Ser. No. 608,305, filed Aug. 27, 1975 by Kelly C. Overman, which is now U.S. Pat. No. 4,040,054 and which is hereby specifically incorporated by reference.

In waveform 1A of FIG. 1, the vertical axis represents the predicted time of arrival of the pulse whose time-voltage history is illustrated in waveform 1B. The horizontal axis of waveform 1A represents actual time. Initially, the tracker is provided with PRI and phase values by signal acquisition methods which are well known to those skilled in the art and one of which is briefly described in relation to FIG. 3. The initial pulse repetition interval is repeatedly decremented by $\Delta t$, a predetermined discrete value, starting at point A in waveform 1A and continuing to point B in waveform 1A as indicated generally by the dashed line. At point B, which is set at W/2, an arbitrary but predetermined value above the time ordinant, the tracker's predicted time of arrival for the signal is restored to its initial value at point C and the tracker opens a window shown in waveform 1C during which the first pulse shown in waveform 1B will be sought for. If the pulse is not found, the predicted time of arrival will continue to steadily decrement by amounts of $\Delta t$ until it again reaches the level W/2 above the time ordinant at which time the tracker's initial predicted time of arrival for the signal will again be restored. If, however, the pulse does occur within the window, a predetermined point on the pulse, as for example, the leading edge of the pulse, is compared with the predicted time of arrival. Discrepancies between the predicted time of arrival and the predetermined point on the pulse which, in our example, is the leading edge, are used to determine error signals which correct for the phase and pulse repetition interval values during the subsequent round of decrementing the predicted time of arrival. The effect of the correction for a phase error is shown in waveform 1A at line D while the effect of a correction of a pulse repetition error is seen at line E. The effect of a correction of a pulse repetition error is also shown at line F of waveform 1D which represents the relative PRI values of the tracker before and after the PRI correction is made.

Figure 2:
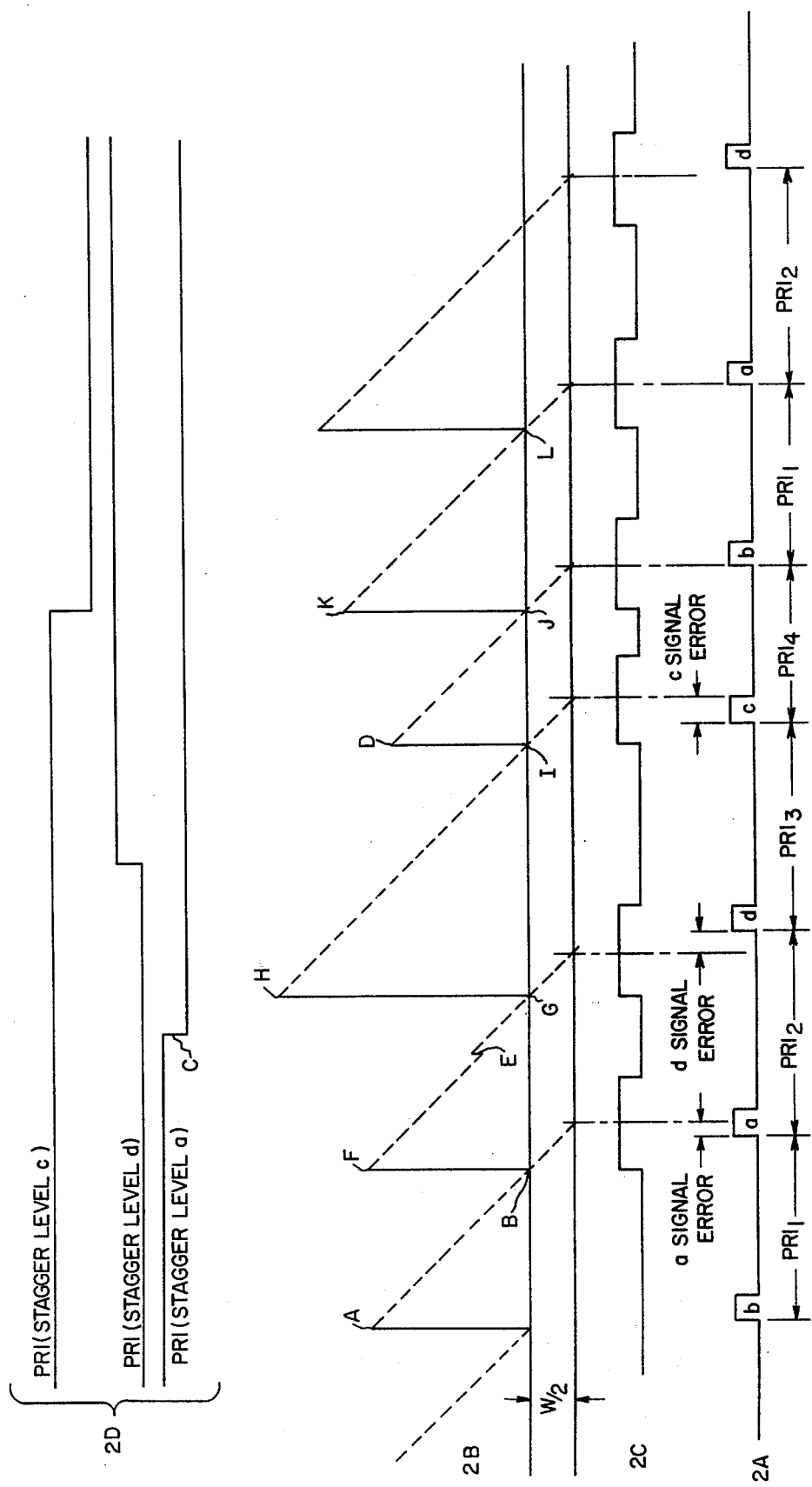
FIG. 2 illustrates the operation of the signal tracker of the preferred embodiment while tracking a signal pulse train having a four level stagger.

As illustrated in FIG. 2, the preferred embodiment of the present invention has capabilities which transcend the example of a single pulse train having a single pulse repetition interval. Waveform 2A shows a pulse train comprised of four phase coherent signals having distinct pulse repetition intervals. Specifically, pulses a and b are separated by $PRI_1$, pulses d and a are separated by $PRI_2$, pulses c and d are separated by $PRI_3$, and pulses b and c are separated by $PRI_4$. Since the pulses are phase coherent, they do not shift with respect to each other but maintain their relationship through the progression of time. Although the values of the $PRI_2$ and $PRI_3$ of waveform of FIG. 2A are equal, this need not necessarily be the case. Persons skilled in the pertinent art generally refer to such a pulse train as having a four level stagger to indicate the number of phase coherent signals having distinct PRI which comprise the signal train.

As with FIG. 1, well known tracker acquisition apparatus and methods may be used to initially determine the pulse repetition intervals and phase relationship of the four level stagger pulse train waveform 2A. As shown in waveform 2B, the pulse repetition interval for the a stagger level is first counted down between points A and B by increments of $\Delta t$. When point B is reached, the tracker begins counting down the pulse repetition interval for signal d, while at the same time, FIG. 2C shows that a window is opened where signal a is looked for. The deviation between the predicted time of arrival for signal a and the leading edge of the actual occurrence of signal a are used to determine the phase and pulse repetition interval correction signals which are to be used in the next prediction for the time of arrival of a signal a pulse. Waveform 2D shows that the PRI correction signal for stagger level a is used to alter the PRI value for stagger level a at point C which is then stored at a known memory address and is not used again until the next predicted time of arrival for signal a is made at point K of waveform 2B. The phase correction, however, may be implemented during the decrementation of the PRI of stagger level d because signals a, b, c and d are themselves phase coherent. This phase correction is shown to be implemented at point E of waveform 2B while the PRI value of signal d is decremented between points F and G. Therefore, the phase correction for signal a is also useful to correct the phases of the phase coherent signals d, c, and b. When point G is reached, the predetermined initial PRI value for signal c is counted down from point H to I. In the same manner as for signal a, any correction in the PRI for signal d is stored in the signal d PRI memory during the decrementation of signal c, while any correction for the phase of signal d is implemented during the decrementation of signal c.

When point I is reached, the tracker calls from the PRI memory for the b signal the corrected PRI value for the b signal and decrements this value between points D and J while any phase correction made for signal c is implemented and a signal c PRI correction is stored in the appropriate memory location. Similarly, when point J is reached, the corrected PRI value for signal a is decremented between points K and L, while the phase correction for signal b is implemented and the PRI value of signal b as corrected is stored in memory. In this manner, the tracker continues to track the stagger levels of the four level pulse train while constantly correcting for errors in the PRI values and the phase relationship predicted by the tracker.

From the above explanation in relation to FIGS. 1 and 2, it will be appreciated that, even though all but one of the stagger levels of a pulse train are absent, as, for example, where the stagger levels b, c and d of FIG. 2 were absent leaving only stagger level a, the preferred embodiment of the described invention will maintain phase coherence for all the signals of the pulse train which are, themselves, phase coherent with respect to each other. Although the PRI prediction of a particular signal cannot be corrected if the signal does not appear in the window which was provided for it, the phase coherence and the phase correction of a single stagger level in the pulse train will provide for phase coherence in all the predicted signals' time of arrival, thereby correcting for drift between the phase of the tracker and the phase of the detected signals whenever a stagger level pulse is detected within its window.

Figure 3:
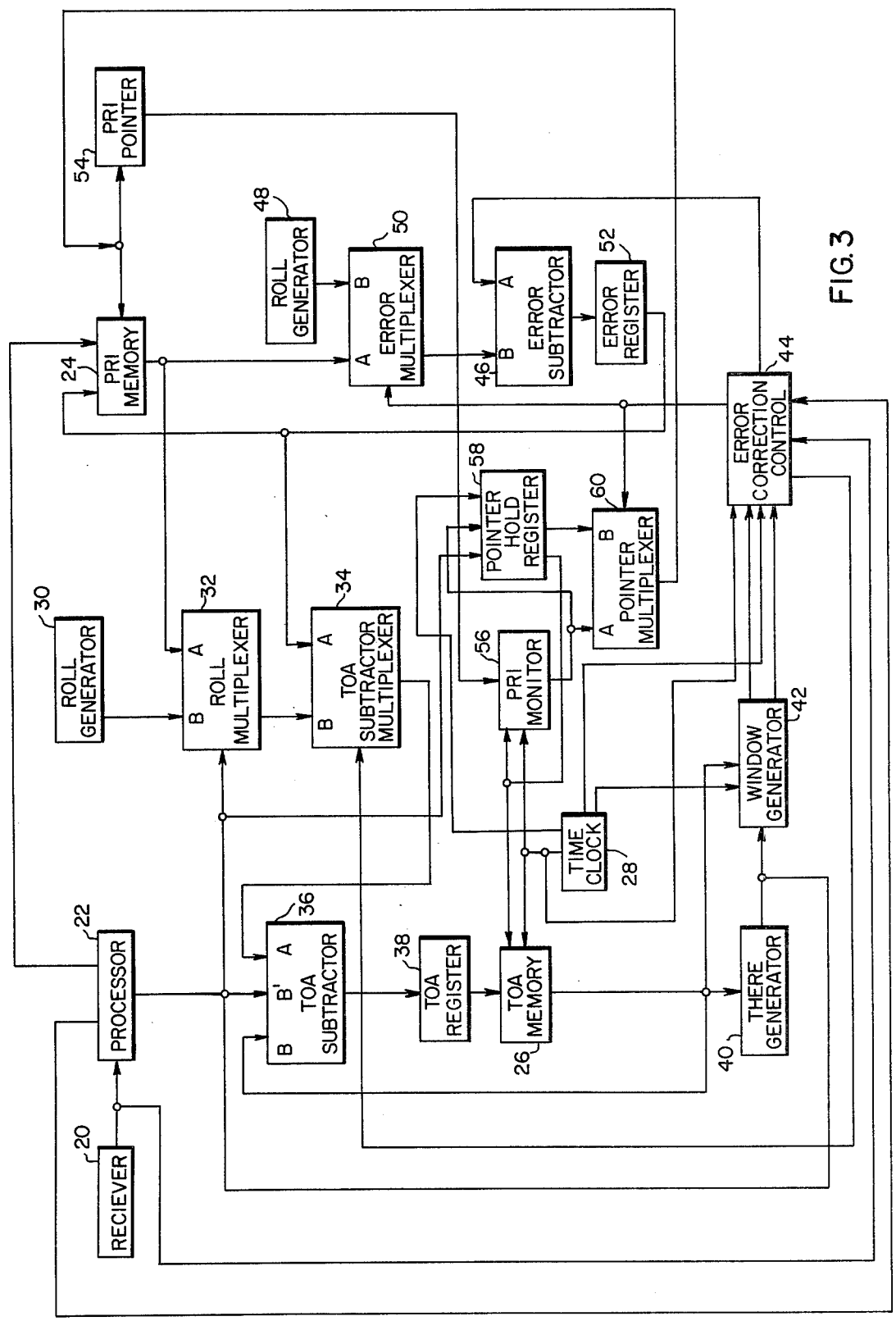
FIG. 3 is a block diagram of the preferred embodiment of the present invention in which a multiplexed tracker predicts the time of occurrence for phase coherent stagger levels of a pulse train.
Figure 9:
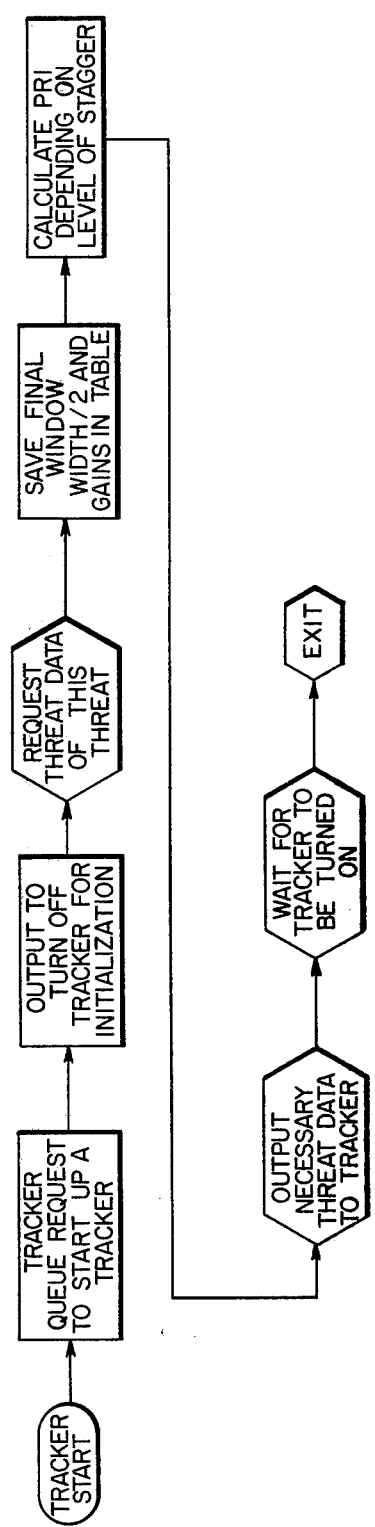
FIG. 9 is a flow chart of a computer program which may be included in one method of tracker signal acquisition.

FIG. 3 shows a block diagram of the preferred embodiment of the present invention, portions of which are further described in FIGS. 4, 5, 6 and 7. The train of signal pulses which, for purposes of illustration, may be considered to be the pulse train shown in waveform 2A, are detected by a receiver 20 and delivered to a processor 22 which establishes an initial PRI and phase condition for each of the phase coherent stagger levels of the pulse train. These initial conditions may be established by any of several well known methods for tracker acquisition. As illustrative of one such method, in the preferred embodiment of FIG. 3 the processor 22 is comprised of a general purpose computer which may be programmed according to the flow diagram shown in FIG. 9. It is emphasized that the present invention is an improvement upon prior art digital trackers which operate to track a previously acquired pulse train and does not relate to pulse train acquisition techniques. The flow chart of FIG. 9 is represented in the interest of clarity in describing the operation of the present invention. For each stagger level of the pulse train, the processor 22 stores an initial PRI value at a specified address in PRI memory 24 and dedicates an address in TOA memory 26 to the detected pulse train and stores a value representing the predicted time of arrival of the next pulse in the train at this address.

The predicted time of arrival stored in the address of TOA memory 26 is counted down by means for counting toward the predicted time of arrival of signals contained in all stagger levels of a signal train by discrete values of time. The counting means includes the TOA memory 26, a time clock 28, a roll generator 30, a roll multiplexer 32, a TOA subtractor multiplexer 34, a TOA subtractor 36, and a TOA register 38. Each time the predicted time of arrival stored at the address of TOA memory 26 is accessed by time clock 28, the roll generator 30 delivers a signal, whose value is substantially equal to $\Delta t$, to the TOA subtractor 36 through roll multiplexer 32 and subtractor multiplexer 34. Roll generator 30 may, in practice, merely be a hand-wired bit of roll multiplexer 32. The initial predicted time of arrival stored in TOA memory 26 is provided to TOA subtractor 36 at terminal B, which then subtracts the value of the signal provided at terminal A from the value of the signal provided at terminal B to provide an output whose value is substantially equal to the value of the predicted time of arrival for the signal pulse decremented by an amount $\Delta t$. The value of $\Delta t$ is made equal to one roll which is the real time between which time clock 28 accesses the tracker address in TOA memory 26 so that the predicted time of arrival of the signal pulse is decremented in real time. The output of TOA subtractor 36 is provided to TOA register 38 which then delivers this value to the tracker address in TOA memory 26. The next time the tracker address of TOA memory 26 is accessed by real time clock 28, this decremented value of the initial predicted TOA is again itself decremented by again subtracting from it a value equal to one roll in TOA subtractor 36, as described above. This decrementing process continues until the value provided to the tracker address in TOA memory 26 by TOA register 38 is less than or equal to some predetermined value which will be identified as W/2.

When the predicted time of arrival stored in the tracker address of TOA memory 26 has been counted down to the value of W/2, the value of the memory address, which is provided to a There generator 40, causes There generator 40 to provide a There signal which performs two functions. First, the There signal is provided as a control input to roll multiplexer 32 to cause roll multiplexer 32 to convey a predicted pulse repetition interval for the next pulse signal from PRI memory 24 to terminal A of TOA subtractor 36 through the subtractor multiplexer 34. This function corresponds to the change in the predicted pulse repetition interval illustrated by the change between points B and F of waveform 2B. Secondly, the There signal provided by There generator 40 is delivered to a window generator 42 for opening a window pulse which corresponds to the first pulse in waveform 2C to search for the arrival of the predicted stagger level pulse There generator 40 and window generator 42 are described in further detail in FIGS. 4 and 5, respectively, which will be discussed later.

The window signal of window generator 42 is provided to error correction control 44 along with the signal pulses detected by receiver 20 and count signals from time clock 28 to provide phase and pulse repetition interval error signals. In addition, error correction control 44 provides flag signals which serve to control the multiplexing of phase and pulse repetition interval corrections to be made to the predicted time of arrival stored in memory 26, as will be explained below.

Figure 6:
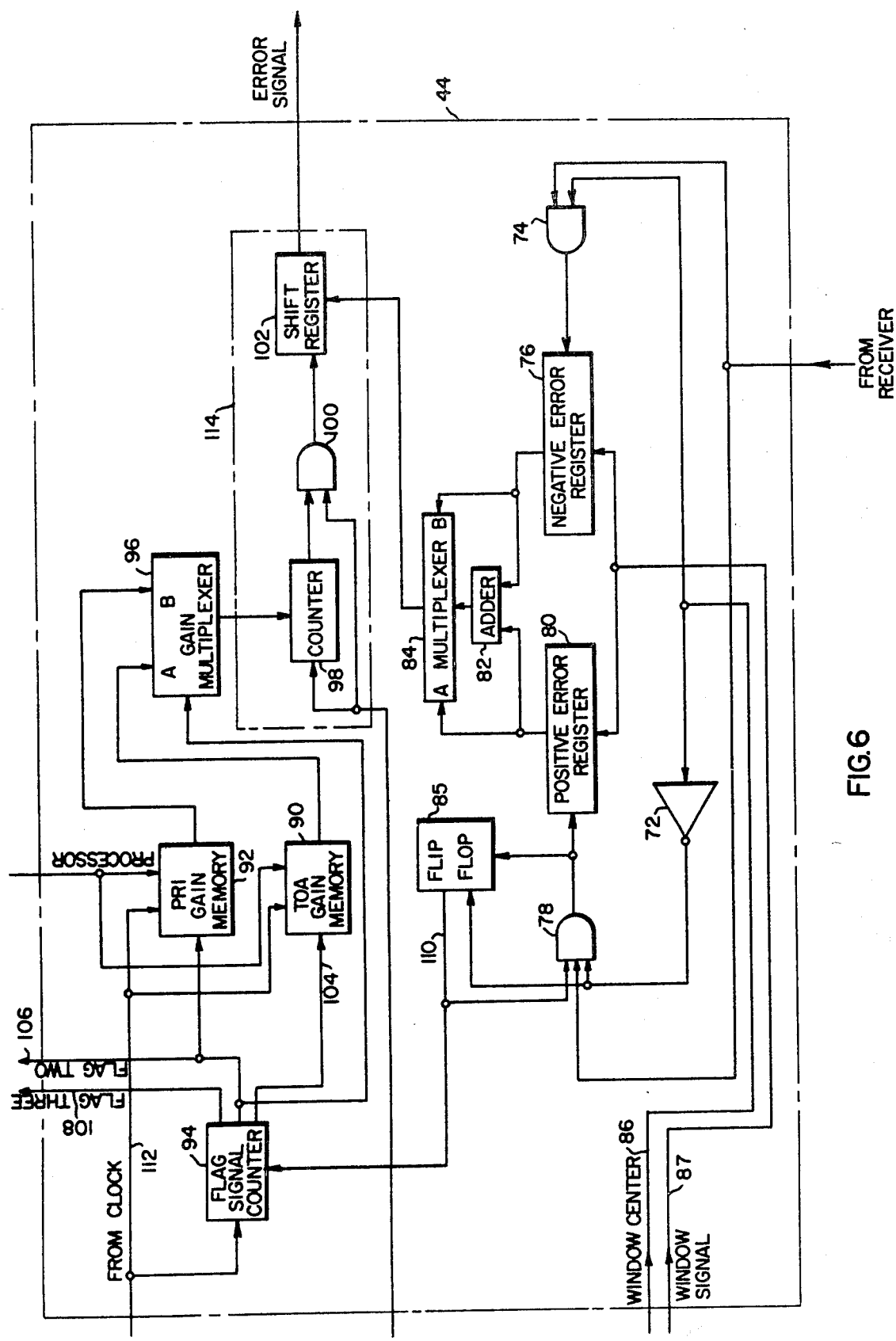
FIG. 6 is a more detailed block diagram of the error correction control shown in FIG. 3.

As will be further described in relation to FIG. 6, error correction control provides a flag one, a flag two, and a flag three control signal. During the occurrence of the flag one control signal, the gain for the phase error of the predicted time of arrival is extracted from a memory element. Subsequent to this first flag signal and prior to a second flag signal, this phase error gain is binarily multiplied by the deviation of the predicted time of arrival from the actual time of arrival determined by error correction control 44 to provide the phase correction which is transferred to error subtractor 46 for processing. The phase error signal of error correction control 44 is provided to terminal A of error subtractor 46. At this time, terminal B of error subtractor 46 is provided with a value of Δt from roll generator 48 through terminal B of error multiplexer 50. In a fashion similar to TOA subtractor 36, error subtractor 46 computes the difference between the deviation between the predicted time of arrival and the actual time of arrival determined by error correction control 44 and the value of one roll determined by roll generator 48. This difference is provided to error register 52 and is then provided to correct the phase of the predicted time of arrival by multiplexing this value through TOA subtractor multiplexer 34 into terminal A of the TOA subtractor 36 upon the occurrence of a flag two control signal provided by error correction control 44 to subtractor multiplexer 34. With an appreciation that subtractor multiplexer 34 is conjunctive in its nature in that it can produce at its output only signals provided to either terminals B or A, depending upon the absence or presence of a flag two control signal, respectively, it will be seen that roll generator 48 was necessary to subtract the value of one roll from the error determined by the error correction control 44 prior to the application of the error signal to terminal A of subtractor multiplexer 34. Although the predicted time of arrival value for a stagger level signal must continue to be counted down in order to maintain coherence with real time, the one roll value of roll generator 30 could not be introduced through roll multiplexer 32 into TOA subtractor 36 at the same time that the correction for the phase was made.

During the occurrence of the flag two signal, the gain for the pulse repetition interval error is extracted from a memory element. Subsequent to the occurrence of the flag two signal and prior to the flag three signal, the pulse repetition interval error gain is multiplied by the deviation of the predicted time of arrival from the actual time of arrival determined for the pulse repetition interval by error correction control 44. As with error for the phase of the predicted time of arrival, error for the pulse repetition interval in the predicted time of arrival is provided to error subtractor 46 to determine the necessary corrections for the pulse repetition interval value stored in PRI memory 24. This correction is accomplished by providing the flag three signal to error multiplexer 50 causing the output of error multiplexer 50 to provide the value supplied to its A terminal from the memory address of PRI memory 24 so that error subtractor 46 subtracts the former PRI value stored at the address of PRI memory 24 from the error determined for the PRI by error correction control 44. This new PRI value is provided to error register 52 and is then returned to the appropriate address in PRI memory 24 from which it may be called to make the next prediction of the time of arrival for the next pulse of the stagger level for which it is predicting.

From the explanation made with regard to FIGS. 2, and 3, it can be seen that where pulse trains having multiple stagger levels are to be tracked by a single tracker, a means must be provided for storing the PRI values of the stagger levels, establishing their order of succession and monitoring their position. The means for storing an arbitrary number of PRI values which correspond to a single tracker includes PRI memory 24 while the means for establishing their order of succession and means for monitoring their position include PRI pointer 54 and PRI monitor 56 respectively. For each tracker address in TOA memory 26, PRI memory 24 is provided with a number of addresses sufficient to accommodate the highest number of stagger levels which are to be tracked by the corresponding tracker. Corresponding to each address in PRI memory 24 is an address in PRI pointer 54 which is also comprised of a memory unit. Where the succession of the examination of the PRI levels of the tracker is to remain in a fixed relation, PRI pointer 54 may be comprised of a read only memory having predetermined fixed values for each memory address. Where additional flexibility is required, PRI pointer 54 may be comprised of a read-write memory so that the order of succession of PRI memory addresses in PRI memory 24 may be changed by writing into PRI pointer 54. Corresponding to each tracker address in TOA memory 26 is an address in PRI monitor 56 which is also comprised of a memory element. Since PRI monitor 56 must have the capability of storing the values at the addresses of PRI pointer 54 successively, TOA pointer must be of the read-write variety. Each address in PRI monitor 56 corresponds to a tracker address in TOA memory 26 and is accessed at the same time as the tracker memory address by time clock 28 so that each time TOA memory 26 is accessed, the PRI address from the PRI memory 24 is selected in the following manner.

On a write signal provided by pointer hold register 58 to TOA memory 26 and PRI monitor 56, information contained at the PRI pointer address of PRI pointer 54 which corresponds to the PRI memory address of PRI memory 24 which is in current use, is written into the PRI monitor 56 at the address corresponding to the tracker address of TOA memory 26 which is associated with PRI memory 24. This information remains in the address of PRI monitor 56 until the monitor address is accessed by clock 28 at which time the value which had been written in by PRI pointer 54 is transferred to terminal A of pointer multiplexer 60 and provided as the output of pointer multiplexer 60 to the addresses of PRI memory 24 and PRI pointer 54 where it is used to select the next address of the PRI memory 24. The PRI pointer information of PRI pointer 54 associated with this next address is then written into the address of PRI monitor 56 associated with the tracker address of TOA memory 26 so that the process continues upon each access of the addresses of the TOA memory 26 and PRI monitor 56 by time clock 28. It will be seen that, if the values in the addresses of PRI pointer 54 associated with each address in PRI memory 24 are the next address of the PRI memory 24 which is desired, the PRI pointer 54 will cooperate with the address in PRI monitor 56 associated with the tracker address in TOA memory 26 to provide the proper order of succession in which the PRI levels will be examined. It can be seen from the above discussion that PRI pointer 54 controls the next address of PRI memory 24 through the address of PRI monitor 56 associated with TOA memory 26.

Figures 7, 8:
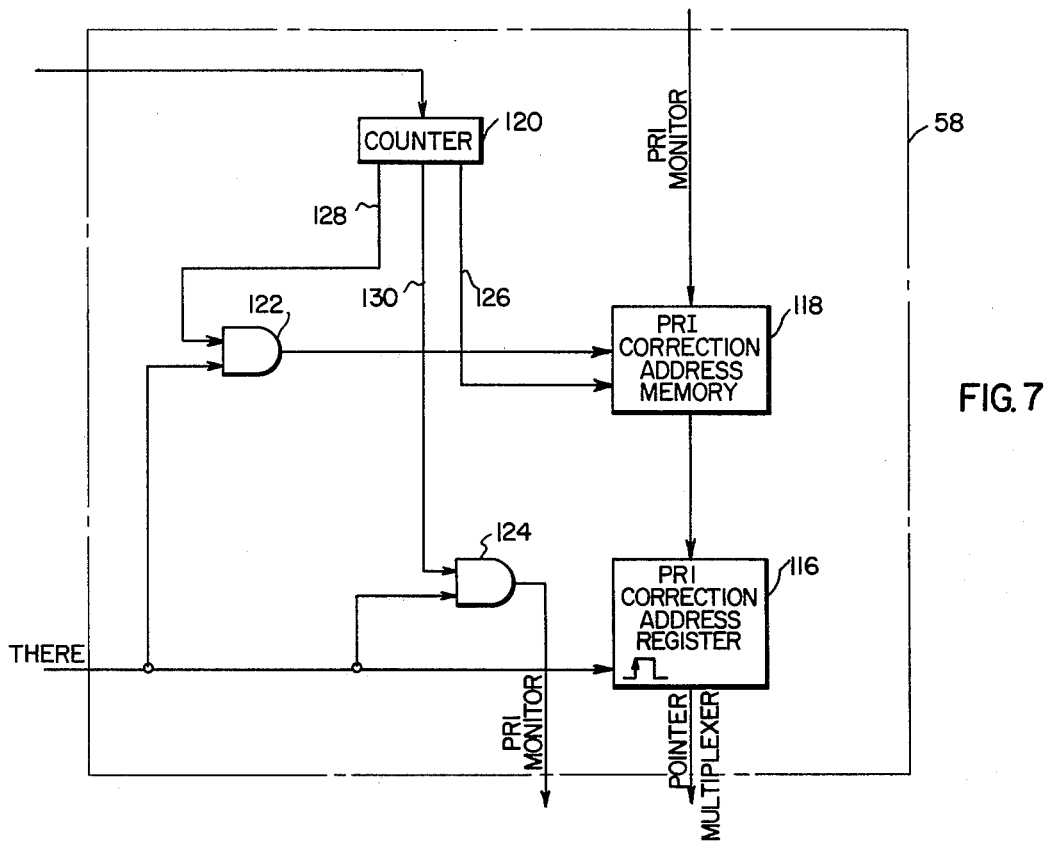
FIG. 7 is a more detailed block diagram of the pointer hold register shown in FIG. 3.
FIG. 8 is a table of values which illustrates the operation of the PRI pointer and the PRI monitor of FIG. 3.

As an illustration of the selection of addresses of PRI memory 24 through PRI pointer 54 and PRI monitor 56, consider the table shown in FIG. 8. In the case of the table in FIG. 8, the particular tracker is to track a pulse train having a four level stagger. Therefore, PRI memory 24 and PRI pointer 54 must have at least four addresses corresponding to the tracker address of TOA memory 26. The initial condition considered in the closed loop of the table of FIG. 8 shows that the address of PRI monitor 56 associated with the tracker address of TOA memory 26 contains a digital one so that the PRI monitor 56 is pointing to the address one of PRI memory 24 and PRI pointer 54. The table also shows that associated with the one address of PRI pointer 54 is an information word having a value of a digital two. When the next There signal is provided to roll multiplexer 32, the PRI memory address which is accessed in PRI memory 24 is determined by the digital number written into the address of PRI monitor 56 corresponding to the tracker address in TOA memory 26. In the illustration of the table, PRI pointer 54 had written into PRI monitor 56 a digital one so that the next PRI value selected would be the value located at the one address of PRI memory 24. At the same time, the address in PRI pointer 54 corresponding to the one address in PRI memory 24 contains a digital two which is written into the address of PRI monitor 56 corresponding to the tracker address of TOA memory 26. The next time a There signal is provided to roll multiplexer 32, the address of PRI monitor 56 corresponding to the tracker address of TOA memory 26 indicates that the PRI value stored at the digital two location of PRI memory 24 should be used. At the same time, the address in PRI pointer 54 corresponding to the digital two address in PRI memory 24 contains a third value, a digital three which is written into the address of PRI monitor 56 corresponding to the tracker address of TOA memory 26. In the same manner as before, when this predicted time of arrival has been counted down to the W/2 value and a There signal is provided to roll multiplexer 32 so that a new PRI memory value is called for, the memory value provided will be that stored at the digital three address of PRI memory 24. The address of PRI pointer 54 corresponding to the digital three address of PRI memory 24 has a value of digital zero which is then written into the address of PRI monitor 56 corresponding to the tracker address in TOA memory 26 to initiate the above described cycle again.

As was explained previously, corrections in the values stored in the PRI addresses of PRI memory 24 are made by the error loop which includes error correction control 44, roll generator 48, error multiplexer 50, error subtractor 46 and error register 52. It will be appreciated that, once this error in the PRI value is determined, this corrected PRI value must be returned to the proper address of PRI memory 24 to maintain a constant sequence in the order of succession of PRI levels. For this purpose, the disclosed apparatus is provided with a pointer hold register 58 and the pointer multiplexer 60 in which the pointer hold register 58 retains the address of the prior PRI memory value of the PRI monitor 56 until the PRI correction can be made. The pointer hold register is further described in relation to FIG. 7. When the corrected PRI value is to be entered in the PRI memory 24, the appropriate address of PRI memory 24 is multiplexed into the memory through terminal B of pointer multiplexer 60 by applying flag three to pointer multiplexer 60.

It is also shown that, by employing a real time clock 28 which counts at a faster rate than is necessary to decrement a single tracker, and by expanding the number of addresses in TOA memory 26 and PRI monitor 56 to accommodate the number of pulse trains which are to be examined, and by expanding the address dimensions of PRI memory 24 and PRI pointer 54 to accommodate the increased number of trackers, basic multiplexing techniques can be used to provide an arbitrary number of trackers while requiring only the hardware necessary for a single tracker. Specifically, for example, if a system of sixteen trackers were to be provided, the real time clock 28 would be multiplexed among sixteen addresses of TOA memory 26 and PRI monitor 56. If each tracker were to have the capability of tracking a four stagger level pulse train, PRI memory 24 and PRI pointer 54 would be comprised of memory elements having a total of sixteen times four addresses.

Figure 4:
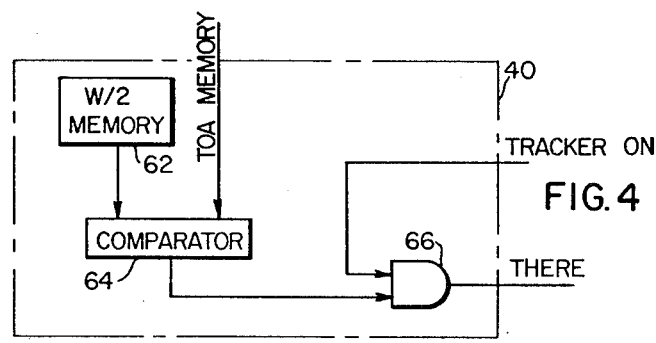
FIG. 4 is a more detailed block diagram of the There generator shown in FIG. 3.

FIG. 4 shows a more detailed block diagram of the There generator 40 shown in FIG. 3 and includes a W/2 memory 62, a comparator 64 and an AND gate 66. The predicted time of arrival provided by TOA memory 26 is compared with a W/2 value provided by W/2 memory 62 in comparator 64 which provides an output whenever W/2 is greater than or equal to the predicted time of arrival value. The output of comparator 64 comprises the input necessary to produce a signal at the output of AND gate 66 which constitutes the There signal.

Figure 5:
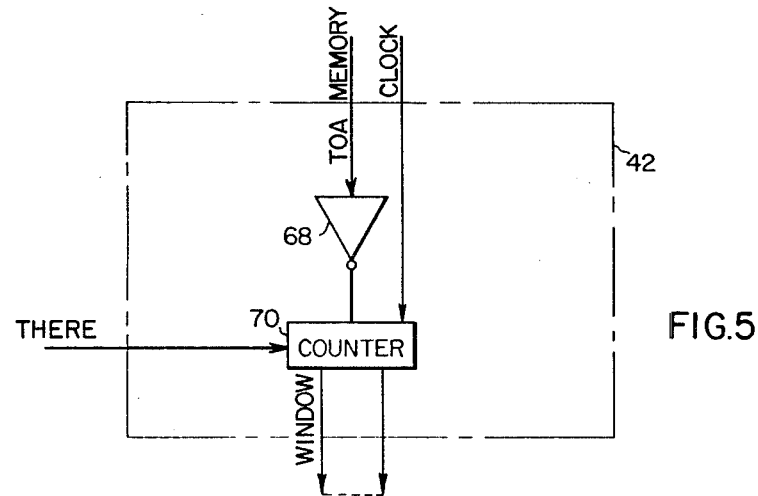
FIG. 5 is a more detailed block diagram of the window generator shown in FIG. 3.

FIG. 5 shows the window generator 42 which was shown in FIG. 3 and includes an inverter 68 and a counter 70. When the inverter 68 is provided with the output TOA value of TOA memory 26 and when window counter 70 is provided with a There signal from There generator 40 and a clock signal from clock 28, the window signal is provided at the output of counter 70. The window counter 70 begins to count at a value substantially equal to W/2 less than zero upon receiving a There signal from There generator 40 to open the window and continues to count through zero to a value substantially equal to W/2 greater than zero at which point the counter stops and the window is closed.

FIG. 6 shows a more detailed block diagram of the error correction control 44 shown in FIG. 3. As explained in relation to FIG. 3, error correction control 44 determines the error of the pulse occurring closest to the center of the window signal provided by window generator 42 and determines a correction for the phase and pulse repetition interval of the predicted time of arrival for the stagger level by multiplying this error by the phase and PRI gains stored in a memory. Error correction control 44 also generates appropriate flag signals for multiplexing the phase and PRI corrections into TOA memory 26 and PRI memory 24 respectively. The portion of error correction control 44 which determines the pulse occurring closest to the center of the window signal provided by window generator 42 includes inverter 72, AND gate 74, negative error register 76, AND gate 78, positive error register 80, adder 82, multiplexer 84, and flip-flop 85.

The window signal from window generator 42 is provided to error correction control on lines 86 and 87, the signal on line 86 being responsive to the state of the most significant bit of the counter 70 so that the signal on line 86 is indicative of the center of the window signal. When the counter 70 of window generator 42 begins counting, the signal on line 86 enables pulses detected by receiver 20 to pass through AND gate 74 and gate the pulse count of counter 70 into negative error register 76. Subsequent pulses from receiver 20 will similarly gate the count value of counter 70 into negative error register 76 until the signal on line 86 indicates that the counter has passed the center of the window signal so that the value of counter 70 corresponding to the last received pulse from receiver 20 before the center of the window is crossed will be the value remaining in negative error register 76. When the counter has crossed the center of the window, the signal on line 87 will then operate through inverter 72 to enable the first pulse detected by the receiver 20 to pass through AND gate 78 to gate the value of counter 70 into the positive error register 80. A signal passing through AND gate 78 also causes flip-flop 85 to change state so that no subsequent pulses can pass through AND 78 until the flip-flop 85 is reset by the termination of the window pulse. The contents of negative error register 76 and positive error register 80 are added in binary adder 82 which causes the output of multiplexer 84 to be provided from terminal A if the sign of the sum is positive, and which causes the output of multiplexer 84 to be provided from terminal B if the sign of the sum is negative.

The apparatus for providing corrections for the phase and the pulse repetition intervals of the predicted time of arrival includes TOA gain memory 90, PRI gain memory 92, flag signal counter 94, gain multiplexer 96, counter 98, AND gate 100 and shift register 102.

The controls signals flag one, flag two, and flag three which have been previously referred to are provided on lines 104, 106, and 108, respectively, in response to signals provided by clock 28 and the output of flip-flop 85 on line 110 which indicates the detection of a pulse in the positive half of the window or the end of a window if no pulses were detected by receiver 20 during the positive half of the window. The gain for the phase error is provided by TOA gain memory 90 in response to a signal from clock 28 on line 112 and in response to flag one on line 104, and passes through gain multiplexer 96 in the absence of a flag two signal. The gain for the pulse repetition interval is provided by PRI gain memory 92 in response to a signal from clock 28 on line 112 and in response to flag two on line 106, and passes through gain multiplexer 96 with the presence of a flag two signal on line 106. The error gains provided by TOA gain memory 90 and by PRI gain memory 92 through gain multiplexer 96 are multiplied by the deviation of the predicted time of arrival from the actual time of arrival by binary multiplexer 114. Binary multiplier 114 includes counter 98, AND gate 100 and shift register 102, combined as shown in FIG. 6 in a manner well known to those skilled in the pertinent art.

The pointer hold register 58 which is shown in FIG. 3 is further described in FIG. 7 and includes PRI correction address register 116, PRI correction address memory 118, counter 120, AND gate 22 and AND gate 124. As explained previously, pointer hold register 58 retains the values of the prior information word stored in the PRI monitor 56 after the monitor 56 has, for each tracker, been written into by the PRI pointer 54 at a There.

In response to clock 28, counter 120 first provides an address signal on line 126 to PRI correction address memory 118 while the information word which is to be retained is contained in PRI monitor 56. Next, counter 120 provides a second signal on line 128 which cooperates with a There signal provided by There generator 40 to provide a write pulse at the output of AND gate 122 to latch the information of PRI monitor 56 into PRI correction address memory 118. Then, after the termination of the second pulse, counter 120 provides a third signal on line 130 which cooperates with the There signal provided by There generator 40 to provide a write pulse at the output of AND gate 124 to latch the information of PRI pointer 54 into PRI monitor 56. However, the prior information word of PRI monitor is still contained in PRI correction address memory 118 and is available to be brought into the PRI correction address register 116 on the rising edge of the next There signal of There generator 40. In this manner, the information word contained in PRI correction address register 116 provides the proper address of the PRI value of PRI memory 24 which is to be corrected by the correction error loop.

We claim:

1. In a signal tracker, apparatus for predicting arrival times of pulse signals contained in a pulse signal train as detected by a receiver of said tracker, said pulse signal train having multiple level staggered pulse repetition intervals, said apparatus comprising means for storing predetermined values representative of said multiple level staggered pulse repetition intervals in said pulse signal train;

means for establishing a phase coherent order in which said predetermined values of said storing means are selected for counting by said counting means; and means coupled to said establishing means and said counting means, for regulating the counting operation of said counting means based on said phase coherent order of said establishing means.

2. The apparatus as claimed in claim 1 wherein said storing means includes:

a first memory in which said predetermined values are stored in predetermined address locations of said first memory; and wherein said establishing means includes:

a second memory having an address corresponding to each address of said first memory, and having an information word stored at each of said addresses which is the address of the first memory location storing the next predetermined value of the phase coherent order selected for counting by said counting means.

3. The apparatus in accordance with claim 2 wherein the signal tracker is operative to track a plurality of pulse signal trains wherein:

the first memory includes an address memory location for storage of each of the predetermined values which are representative of the multiple level staggered pulse repetition intervals corresponding to the plurality of pulse signal trains; and the second memory includes an address memory location corresponding to each address memory location of the first memory, each of said pulse signal trains being tracked having a set of address memory locations in said second memory, the memory locations of each set storing an address of the first memory which contains the next predetermined value of the phase coherent order of counting selection corresponding to the multiple level staggered pulse repetition intervals of the pulse signal train associated therewith; wherein the counting means includes:

a third memory having an address memory location for storage of each selected predetermined value associated with each pulse signal train being tracked for counting through each stored value therein to predict the times of arrival of the pulse signals of each of the plurality of pulse signal trains being tracked; and wherein the regulating means includes:

a fourth memory having an address memory location, corresponding to each address memory location of said third memory, in which is stored the address of a memory location of the first memory which contains the next predetermined value for counting in said third memory, in accordance with the phase coherent order corresponding to the pulse signal train associated therewith.

4. The apparatus in accordance with claim 3 wherein the regulating means further includes a tracker counter operative to cycle through a plurality of address states, each state being representative of a pulse signal train being tracked; wherein the tracker counter is coupled to the third memory to access the memory locations thereof to count the selected predetermined values contained therein in a multiplexed manner; and wherein the tracker counter is also coupled to the fourth memory to register the selection of the next predetermined value for counting in said third memory in accordance with the phase coherent selection order of the corresponding pulse train being tracked.

5. In a signal tracker, apparatus for predicting the arrival times of pulse signals contained in a pulse signal train as detected by a receiver of said tracker, said pulse signal train having multiple level staggered pulse repetition intervals, said tracker having an error correction loop which corrects the predicted arrival times of said pulse signals in response to the deviation between the predicted time of arrival and the actual detection of the pulse signal by said receiver, the apparatus comprising:

means for storing predetermined values representative of said multiple level staggered pulse repetition intervals in said pulse signal train;

means for counting through predetermined values selected from said storing means to predict the times of arrival of the pulse signals of said pulse signal train;

means for establishing a phase coherent order in which said predetermined values of said storing means are selected for counting by said counting means; and means coupled to said establishing means and said counting means for regulating the counting operations of said counting means based on said phase coherent order of said establishing means;

means for identifying a pulse repetition interval predetermined value of said storing means which is to be corrected by said error correction loop; and means for correcting said identified pulse repetition interval predetermined value of said storing means substantially at the time when the correction is made by said error correction loop.

6. The apparatus claimed in claim 5 in which said error correction loop of said signal tracker corrects the phase of said pulse signal train in response to the deviation between the predicted pulse arrival time and the actual detection of the corresponding pulse.

7. The apparatus as claimed in claim 5 wherein said storing means includes:

a first memory in which said predetermined values are stored in predetermined address locations of said first memory; and wherein said establishing means includes:

a second memory having an address corresponding to each address of said first memory, and having an information word, stored at each of said addresses, which is the address of the first memory location storing the next predetermined value of the phase coherent order selected for counting by said counting means.

8. The apparatus in accordance with claim 7 wherein the counting through of the selected predetermined value by said counting means is performed in a first and second phase, said first phase being conducted until the selected predetermined value reaches a predetermined level and thereafter, said second phase being conducted in conjunction with the error correction loop to determine the deviation between the predicted and actual pulse signal time of arrival.

9. The apparatus in accordance with claim 8 wherein the regulating means includes a memory location which stores the address of a memory location in the storing means which contains the next predetermined value of the phase coherent selection order for counting through its first phase by said counting means; wherein the identifying means includes a corresponding memory location which stores the address of a memory location in the storing means which contains the present predetermined value of the phase coherent selection order being counted through its second phase by said counting means; and wherein the contents of said memory locations of the counting, regulating and identifying means are updated substantially at the transition between the first and second counting phases of said counting means, whereby the next predetermined value is counted through its first phase during the time when the present predetermined value is counted through its second phase.

10. The apparatus in accordance with claim 7 wherein the signal tracker is operative to track a plurality of pulse signal trains wherein:

the first memory includes an address memory location for storage of each of the predetermined values which are representative of the multiple level staggered pulse repetition intervals corresponding to the plurality of pulse signal trains; and the second memory includes an address memory location corresponding to each address memory location of the first memory, each of said pulse signal trains being tracked having a set of address memory locations in said second memory, the memory locations of each set storing an address of the first memory which contains the next predetermined value of the phase coherent order of counting selection corresponding to the multiple level staggered pulse repetition intervals of the pulse signal train associated with the set; wherein the counting means includes:

a third memory having an address memory location for storage of each selected predetermined value associated with each pulse signal train being tracked for counting through each stored value therein to predict the times of arrival of the pulse signals of each of the plurality of pulse signal trains being tracked; and wherein the regulating means includes:

a fourth memory having an address memory location, corresponding to each address memory location of said third memory, in which is stored the address of a memory location of the first memory which contains the next predetermined value for counting in said third memory in accordance with the phase coherent order corresponding to the pulse signal train associated therewith.

11. The apparatus in accordance with claim 10 wherein the counting through of the selected predetermined values by said counting means are performed individually in first and second phases, said first counting phase of one selected predetermined value being conducted until said one selected predetermined value reaches a predetermined level associated therewith and thereafter said second counting phase thereof being conducted in conjunction with the error correction loop to determine the deviation between the predicted and actual pulse signal times of arrival of the pulse signal train associated with said one selected predetermined value.

12. The apparatus in accordance with claim 11 wherein each address memory location of the fourth memory stores the address of a memory location of the first memory which contains the next predetermined value for counting through its first phase in said third memory in accordance with the phase coherent order corresponding to the pulse signal train associated therewith, and wherein the identifying means includes:

a fifth memory having an address memory location, corresponding to each address memory location of the fourth memory, in which is stored the address of a memory location of the first memory which contains the present predetermined value for counting through its second phase, at times, by the counting means in accordance with the phase coherent order corresponding to the pulse signal train associated therewith.

13. The apparatus in accordance with claim 12 wherein the corresponding memory locations in the third, fourth, and fifth memories associated with one pulse train are updated substantially at the transition between the first and second counting phases of the selected predetermined value corresponding to the one pulse train.

14. The apparatus in accordance with claim 12 wherein the regulating means further includes a tracker counter operative to cycle through a plurality of address states, each state being representative of a pulse signal train being tracked, wherein said tracker counter is coupled to the third memory to access the memory locations thereof to count the selected predetermined values contained therein through their first counting phases in a multiplexed manner, and wherein the tracker counter is also coupled to the fourth and fifth memories to register concurrently corresponding memory locations therein for selecting their respectively associated next and present predetermined values in accordance with the phase coherent order of the corresponding pulse train being tracked.

* * * * *